UNITED STATES PATENT OFFICE.

GRAY STAUNTON, OF CHICAGO, ILLINOIS, ASSIGNOR, BY MESNE ASSIGNMENTS, TO WILLIAM S. POTWIN, OF CHICAGO, ILLINOIS.

PONTIANAK COMPOUND AND METHOD OF PREPARING SAME.

1,078,070.  Specification of Letters Patent.  Patented Nov. 11, 1913.

No Drawing.   Application filed June 10, 1907. Serial No. 378,300.

*To all whom it may concern:*

Be it known that I, GRAY STAUNTON, a citizen of the United States, residing at Chicago, Cook county, Illinois, have invented certain new and useful Improvements in Pontianak Compounds and in Methods of Preparing the Same, of which the following is hereby declared to be a full, clear, and exact description.

Pontianak or getah jelutong, as it is sometimes called, appears upon the market as a cheap, inelastic gum constituting the coagulated latex of *Dyera costulata*. The gum takes its name from the export town of Pontianak, Borneo, and is sold in the form of loaves or lumps of cheese-like shape, externally of light brown color, although nearly white and of granular structure within.

Instead of resembling india rubber, pontianak appears more like a very resinous gutta-percha of extremely low grade. It contains a marked percentage of water which exudes under pressure; it can be easily worked with the fingers but possesses very little tenacity. The gum is not to be sheeted upon the washing rolls without preliminary immersion in hot water for a long while beforehand. Upon the mixing rolls, pontianak forms a very sticky, tenacious mass that suggests the manner of its familiar use in low grade mixings, as a friction or a filler.

By proper course of treatment, in conjunction with suitable re-agents, according to the present invention, crude pontianak becomes transformed into a pontianak compound of far higher grade, suited for direct admixture with pure Pará gum, in varying proportions familiar to the trade, much the same as if the new stuff were an india rubber of inferior grade, or were some one of the re-claimed rubbers which, minutely divided, constitute the ground shoddy so often employed as a regular ingredient in more recent practice among india rubber manufacturers.

Not only does the modified pontianak serve as a valuable ingredient in compounding rubber mixtures preliminary to vulcanization, but, when united as a binder in intimate relation with flax fiber, after the manner presently detailed, an insulation material of high resistance results, which is especially serviceable in exposed situations out of doors where most articles of the sort are apt to quickly deteriorate from the weather.

In ordinary practice, excellent results are to be had on admixture of the following, viz: (*a*) pontianak, 4 parts; (*b*) cotton-seed oil, 8 parts; (*c*) air-slaked lime, dry, 2 parts; and, (*d*) flowers of sulfur, 2 parts.

One-half the portion of cotton-seed oil is first heated in an open kettle to about 200° F., the crude pontianak being crumbled and added portionwise, while brisk stirring proceeds. The heat is gradually increased as stirring goes on, so that a final temperature of about 450° F. is reached, just about the time that the last portions of pontianak come in. With persistent stirring, all lumps gradually disappear so that the batch becomes homogeneous and resembles somewhat a thin mucilage solution. Whether the oil renders the pontianak soluble by reason of the quantity of resins associated in the gum is likely conjecture, but, whatever the cause, it is certain that the liquid condition at high temperature affords abundant chance for rapid dissemination of the flowers of sulfur through and through the mass, at the stage of treatment later on. Thereupon, the remaining half portion of the cotton-seed oil is quickly added, this causing a marked fall in temperature, *e. g.*, say, about 50° F. Next, the air-slaked lime is stirred in, portionwise, to avoid the formation of lumps. The presence of lime causes the batch to change from light brown to yellow, and renders the charge somewhat stringy, after the manner of a thick paste, the temperature dropping gradually to about 350° F. This stage is reached, say, some two hours after the start occurs. Finally, the flowers of sulfur are briskly stirred into the batch which—at the high heat—melts the sulfur and allows it to settle away in liquid state near the bottom. Persistent stirring keeps the sulfur minutely disseminated through and through the mass. In presence of sulfur, the charge begins to swell and effervesce, coagulating into lumps of various size which proceed to separate from the magma and coalesce eventually into an homogeneous mass all over the kettle. The heat being shut off, the viscid charge, still in swollen state, is poured into shallow molds (cement) to a depth of some six inches and is left to cool in the open air.

Save for the cost, oil of corn, linseed, or the like, can be taken in lieu of the oil of cotton-seed for preparation of modified pontianak. So also, temperatures, proportions and duration of treatment, as heretofore laid down, are given merely for illustration, to better aid the skilled, and are not to be taken as in limitation.

The product obtained by the foregoing process, constitutes of itself an article of commerce, capable of widespread use in the compounding of rubber. Without further preparation it is ready for incorporation at the mixing rolls, just the same as if the new material were some crude rubber of medium or low grade sort.

For preparation of the improved insulator compound, employing a modified pontianak as an ingredient, excellent results ensue on resort to the following formula, viz: (a) pontianak, modified, 5 parts; (b) dry slaked lime, 2½ parts; (c) flowers of sulfur, 2½ parts; (d) clear black, i. e., C. B. or rubber dust, 5 parts; and, (e) flax fiber, 7½ parts.

In compounding, the ordinary mixing rolls—preferably run at even speed—are employed at moderate temperature, e. g., 100° F. First, the modified pontianak is put into the rolls, after which the lime and sulfur follow, these being added portionwise as in usual practice for compounding with rubber. Next, follows the clear black or dust, incorporated in like fashion, the several additions requiring for absorption some five minutes altogether. Finally, the dry flax fiber is fed portionwise, causing the batch to stiffen rapidly until it attains sheet form, while slight additions of degras (1–1½ lbs.) are made to aid in sheeting, exactly the same as is familiar practice in dealing with "hard" working or heavily compounded rubber stock. After some 20–30 minutes' run, the fiber becomes thoroughly broken and intimately distributed throughout the mass so that the batch assumes tenacious sheet form ready for molding or other treatment, after the manner of ordinary rubber compounds.

The improved product can be cured as usual in the familiar vulcanizing oven, but it acts very quickly, a sheet, say, one-quarter of an inch thick, requiring only about one hour's exposure at 60 lbs. pressure.

The flax fiber comes from flax straw which, on being run through a brake, yields tow. If the tow be charged into a rotary digester and there be treated for some six hours with 12% solution of caustic potash or soda at 125 lbs. pressure, the fiber remnant is left practically freed from the woody shive so that upon thorough washing and drying a purified substance is obtained, properly suited for use in accord with the invention.

Owing to its peculiarity of structure, as a minute tubule, the flax fiber appears to develop a high insulating quality when united with the modified pontianak by vulcanization, such as would not ensue if common cotton fiber, for example, were used instead. On its part, the modified pontianak is not only much cheaper but seems to insure the quality of the product for insulation purposes, being far superior to the ordinary sorts of india rubber.

In preparing the modified pontianak, the presence of lime is found very advantageous, one reason being that it enables the finished material to be used in compounding white or colored goods, other than black. To lessen the quantity of lime materially, or to omit it altogether, renders the final product of inferior dark color that it is fit only for compounding black goods. Hence, the use of lime, while by no means essential, is generally desirable.

Having thus described my invention, what I claim as new, and desire to secure by Letters Patent, is:—

1. As a new article of manufacture, a vulcanizable rubber-substitute comprising a plastic compound of coagulated, sulfurized pontianak and oil, substantially as described.

2. As a new article of manufacture, a vulcanizable rubber substitute comprising a plastic compound of coagulated, sulfurized pontianak and oil and lime, substantially as described.

3. The process of preparing a plastic rubber substitute, which consists in liquefying crude pontianak in a hot bath of suitable oil, and reacting on the liquefied pontianak and oil with sulfur, substantially as described.

4. The process of preparing a plastic rubber substitute which consists in supplying a hot bath of suitable oil with additions of crude pontianak, lime and sulfur and, after union is completed, cooling and solidifying the product, substantially as described.

5. As a new article of manufacture, the insulator material consisting of a coagulated, sulfurized compound of pontianak and oil in vulcanized union with sulfur and a suitable filler, substantially as described.

6. As a new article of manufacture, the insulator material consisting of a coagulated, sulfurized compound of pontianak and a suitable oil in vulcanized union with fiber and a suitable filler, substantially as described.

GRAY STAUNTON.

Witnesses:
  JAMES H. PEIRCE,
  KATHARINE GERLACH.